(12) United States Patent
Hsiao

(10) Patent No.: US 8,744,274 B2
(45) Date of Patent: Jun. 3, 2014

(54) OPTICAL TRANSMITTER DEVICE

(75) Inventor: Yu-Chao Hsiao, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 70 days.

(21) Appl. No.: 13/535,698

(22) Filed: Jun. 28, 2012

(65) Prior Publication Data

US 2013/0170835 A1 Jul. 4, 2013

(30) Foreign Application Priority Data

Dec. 30, 2011 (TW) .............................. 100150048 A

(51) Int. Cl.
*H04B 10/04* (2011.01)

(52) U.S. Cl.
USPC ............. 398/187; 398/183; 398/79; 398/160; 398/192

(58) Field of Classification Search
CPC ... H04B 10/505; H04B 10/503; H04B 10/506
USPC ........... 398/182, 183, 186, 187, 192–198, 79, 398/160
See application file for complete search history.

(56) References Cited

U.S. PATENT DOCUMENTS

| | | | | |
|---|---|---|---|---|
| 5,978,395 | A * | 11/1999 | Nomura ........................... | 372/34 |
| 6,603,781 | B1 * | 8/2003 | Stinson et al. ................... | 372/23 |
| 6,961,552 | B2 * | 11/2005 | Darabi et al. ............... | 455/241.1 |
| 7,164,865 | B2 * | 1/2007 | Tatsuno et al. ................. | 398/201 |
| 7,236,656 | B2 * | 6/2007 | Welch et al. ..................... | 385/14 |
| 7,332,933 | B2 * | 2/2008 | Kim et al. ......................... | 326/30 |
| 7,852,745 | B2 * | 12/2010 | Carroll ........................... | 370/206 |
| 8,155,488 | B2 * | 4/2012 | Nilsson et al. .................. | 385/14 |
| 8,520,709 | B2 * | 8/2013 | Baroni et al. .................... | 372/31 |
| 2003/0223757 | A1 * | 12/2003 | Yamamoto et al. ............ | 398/146 |
| 2008/0310464 | A1 * | 12/2008 | Schneider ....................... | 372/22 |
| 2013/0011134 | A1 * | 1/2013 | Hsiao .............................. | 398/43 |
| 2013/0250979 | A1 * | 9/2013 | Muendel et al. ................ | 372/20 |

* cited by examiner

*Primary Examiner* — Daniel Washburn
*Assistant Examiner* — Hibret Woldekidan
(74) *Attorney, Agent, or Firm* — Novak Druce Connolly Bove + Quigg LLP

(57) ABSTRACT

An optical transmitter device includes a laser source, a driving circuit, and an optical modulator. The driving circuit is connected to the laser source. The driving circuit includes a thermistor configured for compensating the temperature variation of the laser source to stabilize the frequency of a laser beam output from the laser source. The optical modulator is configured for modulating the laser beam to form a plurality of second laser beams which have different frequencies.

7 Claims, 1 Drawing Sheet

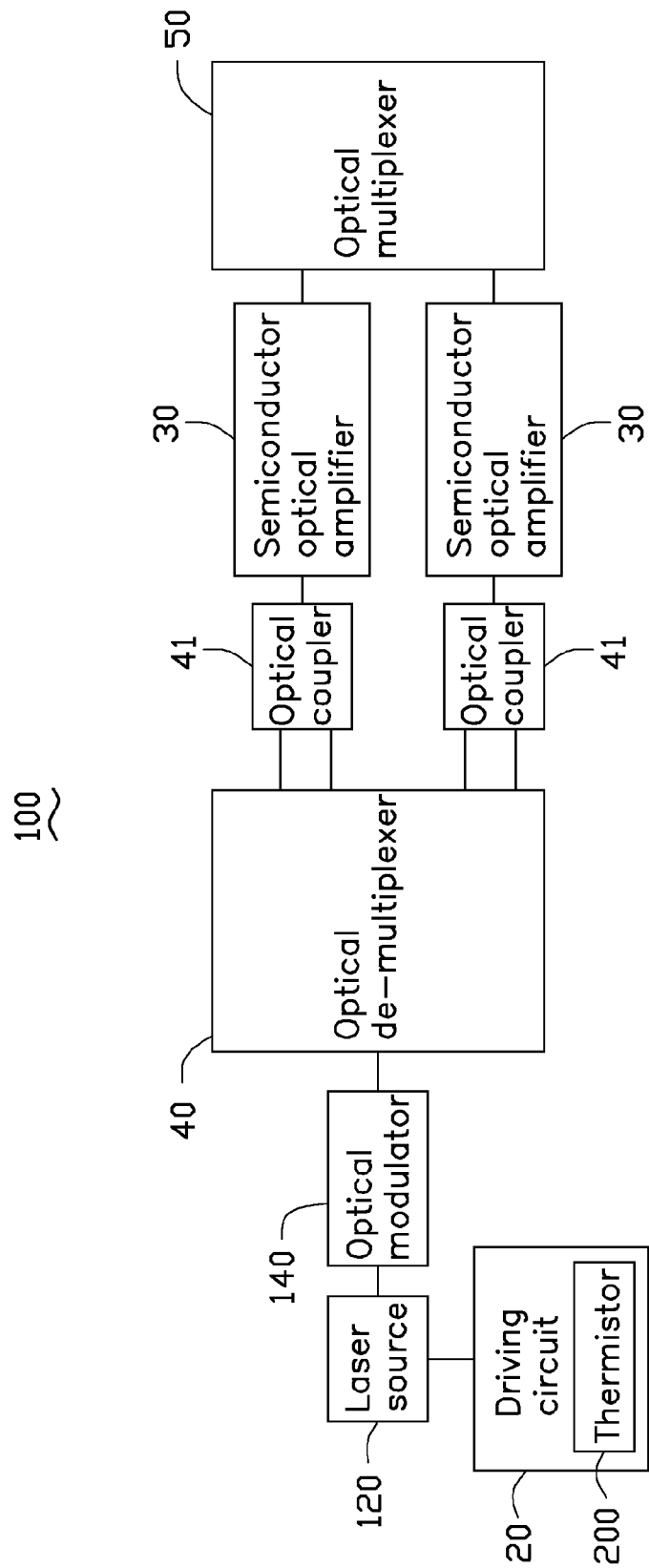

OPTICAL TRANSMITTER DEVICE

BACKGROUND

1. Technical Field

The present disclosure relates to an optical communication system, particularly to an optical transmitter device.

2. Description of Related Art

Laser sources are often used in optical transmitter devices for producing optical signals. Yet, the optical power of a single laser source is limited, and wavelength of the optical signals easily change with changes in temperature of the laser source, which can affect signal quality.

What is needed, therefore, is an optical transmitter device that will overcome the above mentioned shortcomings.

BRIEF DESCRIPTION OF THE DRAWING

Many aspects of the present disclosure can be better understood with reference to the following drawing. The components in the drawing are not necessarily drawn to scale, the emphasis instead being placed upon clearly illustrating the principles of the present disclosure.

The FIGURE is a schematic view of an optical transmitter device of an exemplary embodiment of the disclosure.

DETAILED DESCRIPTION

The FIGURE shows an optical transmitter device 100 of one embodiment. The optical transmitter device 100 is configured for transmitting optical signals in an optical communication system. The optical transmitter device 100 includes a laser source 120, an optical modulator 140, a driving circuit 20 and two semiconductor optical amplifiers 30. In this embodiment, the laser source 120 is a semiconductor laser, for example, a Fabry-Perot laser diode (FP LD). The laser source 120 produces a laser beam with a particular frequency. The optical modulator 140 is a Mach-Zehnder optical modulator. The optical modulator 140 modulates the laser beam to form a number of laser beams which have different frequencies f1, f2, f3, f4 respectively.

The driving circuit 20 is connected to the laser source 120. The driving circuit 20 includes a thermistor 200 to compensate for the temperature variation of the laser source 120. Therefore, the wavelength of the laser beam output from the laser source 120 can be stabilized.

The semiconductor optical amplifiers 30 are connected to the optical modulator 140, directly or indirectly. Each of the semiconductor optical amplifiers 30 is used to mix two laser beams which have different frequencies, for example, f1, f2, to produce four laser beams. The frequencies of the four laser beams are, for example, $2*f1-f2, f1, f2, 2*f2-f1$. In this way, two laser beams are enhanced to four laser beams.

The optical transmitter device 100 further includes an optical de-multiplexer 40 connected to the optical modulator 140, and two optical couplers 41 connected to the optical de-multiplexer 40 respectively. Each semiconductor optical amplifier 30 is connected to a corresponding optical coupler 41. The optical de-multiplexer 40 separates the laser beams from each other. Two laser beams having frequencies f1, f2 are output to one optical coupler 41. The optical coupler 41 couples the two laser beams to the corresponding semiconductor optical amplifier 30. The other two laser beams having frequencies f3, f4 are output to the other optical coupler 41. The other optical coupler 41 couples the other two laser beams to the other semiconductor optical amplifier 30.

The optical transmitter device 100 further includes an optical multiplexer 50 connected to the two optical amplifiers 30. The optical multiplexer 50 combines the laser beams output from the optical amplifiers 30 to one carrier signal. The carrier signal can be transmitted by an optical fiber.

In other embodiments, the number of the semiconductor optical amplifier 30 can be only one. The optical de-multiplexer 40, the optical coupler 41, and the optical multiplexer 50 may be omitted. The semiconductor optical amplifier 30 is connected to the optical modulator 140 directly and can be connected to an optical fiber.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. An optical transmitter device, comprising:
    a laser source configured for emitting laser beam;
    a driving circuit connected to the laser source, the driving circuit comprising a thermistor configured for compensating temperature variation of the laser source to stabilize frequency of the laser beam output from the laser source;
    an optical modulator configured for modulating the laser beam to form a plurality of second laser beams which have different frequencies; and
    at least one semiconductor optical amplifier in communication with the optical modulator, each of the at least one semiconductor optical amplifier configured for mixing two of the second laser beams which have frequencies f1, f2, to obtain four third laser beams which have frequencies, $2*f1-f2, f1, f2, 2*f2-f1$.

2. The optical transmitter device of claim 1, further comprising an optical de-multiplexer connected between the optical modulator and the at least one semiconductor optical amplifier, the optical de-multiplexer configured for separating the second laser beams from each other.

3. The optical transmitter device of claim 2, further comprising at least one optical coupler, each optical coupler being connected between the optical de-multiplexer and a respective one of the at least one semiconductor optical amplifier.

4. The optical transmitter device of claim 1, wherein the number of the at least one semiconductor optical amplifier is two.

5. The optical transmitter device of claim 4, further comprising an optical multiplexer connected to the two optical amplifiers.

6. The optical transmitter device of claim 1, wherein the laser source is Fabry-Perot laser diode.

7. The optical transmitter device of claim 1, wherein the optical modulator is a Mach-Zehnder optical modulator.

* * * * *